(12) United States Patent
Kelly (10) Patent No.: US 12,499,215 B1
(45) Date of Patent: Dec. 16, 2025

(54) CONTEXT-SENSITIVE TOKEN-BUCKET RATE LIMITING IN eBPF

(71) Applicant: CrowdStrike, Inc., Sunnyvale, CA (US)

(72) Inventor: Martin Kelly, Bothell, WA (US)

(73) Assignee: CrowdStrike, Inc., Sunnyvale, CA (US)

(*) Notice: Subject to any disclaimer, the term of this patent is extended or adjusted under 35 U.S.C. 154(b) by 0 days.

(21) Appl. No.: 19/049,682

(22) Filed: Feb. 10, 2025

(51) Int. Cl.
  *G06F 21/54* (2013.01)
  *G06F 21/55* (2013.01)
  *G06F 21/60* (2013.01)

(52) U.S. Cl.
  CPC .......... *G06F 21/54* (2013.01); *G06F 21/552* (2013.01); *G06F 21/606* (2013.01)

(58) Field of Classification Search
  CPC ....... G06F 21/54; G06F 21/552; G06F 21/606
  USPC .......................................................... 726/26
  See application file for complete search history.

(56) References Cited

U.S. PATENT DOCUMENTS

| | | | | |
|---|---|---|---|---|
| 10,592,380 | B2* | 3/2020 | Borello | G06F 21/57 |
| 2008/0244304 | A1* | 10/2008 | Sisolak | G06F 1/04 |
| | | | | 713/600 |
| 2010/0180045 | A1* | 7/2010 | Weinstock | H04L 47/70 |
| | | | | 709/232 |
| 2014/0280892 | A1* | 9/2014 | Reynolds | H04L 43/0876 |
| | | | | 709/224 |
| 2018/0191629 | A1* | 7/2018 | Biederman | H04L 47/6225 |
| 2023/0401079 | A1* | 12/2023 | Radi | G06F 9/5077 |
| 2024/0054078 | A1* | 2/2024 | Eqbal | G06F 12/109 |
| 2024/0086558 | A1* | 3/2024 | Jadhav | G06F 21/6218 |
| 2025/0110890 | A1* | 4/2025 | Uttormark | G06F 12/10 |

FOREIGN PATENT DOCUMENTS

| | | |
|---|---|---|
| CN | 107566289 A | 1/2018 |
| CN | 109639594 A | 4/2019 |
| CN | 111526064 A | 8/2020 |
| WO | WO-2021197128 A1 * | 10/2021 ........... H04L 47/215 |

* cited by examiner

*Primary Examiner* — Taghi T Arani
*Assistant Examiner* — Pegah Barzegar
(74) *Attorney, Agent, or Firm* — Womble Bond Dickinson (US) LLP (57) ABSTRACT

The present disclosure provides techniques for context-sensitive token-bucket rate limiting. A processing device obtains, in a kernel space of an operating system (OS), a message comprising a unique process identifier (UPID) and a message type. The processing device determines whether to send the message from the kernel space to a user space of the OS based on at least one of: the UPID, the message type, or a token count and a discrete time unit in an entry in a data structure in the kernel space. The processing device processes the message based on the determination of whether to send the message from the kernel space to the user space.

20 Claims, 5 Drawing Sheets

202
Obtain, in a kernel space of an OS, a message comprising a UPID and a message type

204
Determine whether to send the message from the kernel space to a user space of the OS based on at least one of: the UPID, the message type, or a token count and a discrete time unit in an entry in a data structure in the kernel space

206
Process the message based on the determination of whether to send the message from the kernel space to the user space

CONTEXT-SENSITIVE TOKEN-BUCKET RATE LIMITING IN eBPF

TECHNICAL FIELD

Aspects of the present disclosure relate to an extended Berkeley packet filter (eBPF), and more particularly, to context-sensitive token-bucket rate limiting in an eBPF.

BACKGROUND

Cybersecurity refers to the practice of protecting computer systems, networks, and digital assets from theft, damage, unauthorized access, and various forms of cyber threats. Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware.

A Berkeley packet filter (BPF) allows a set of rules to be defined for filtering network packets at a low level. For example, BPF provides a raw interface to network packets for specifying filtering criteria based on various packet attributes, such as source addresses, destination address, protocol type, port number, etc. The set of defined rules can be used to capture, drop, and/or modify packets in real time.

An extended Berkeley packet filter (eBPF) is different from the classic BPF in that eBPF allows for more complex and versatile packet processing as well as general purpose in-kernel programmability. For example, eBPF programs may be implemented for execution of custom programs within a kernel without needing to add additional modules or modifying the kernel source code. In another example, eBPF programs may be used for cybersecurity purposes.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A security monitoring application, such as an eBPF-based security monitoring application, may track processes created by an operating system (OS). When activity in a kernel space of the OS occurs, the security monitoring application may send a message (e.g., an eBPF message) corresponding to a process from the kernel space of the OS to a user space of the OS via a message buffer (e.g., a ring buffer), where the message may be used in the user space for cybersecurity related purposes. In some execution environments, a relatively large number of processes may be tracked, and as such, the security monitoring application may generate a relatively large number of messages. Processing large numbers of messages may be associated with computational overhead. Furthermore, the message buffer may have a fixed size. When the message buffer becomes full (e.g., due to the computational overhead associated with processing the messages), new messages sent to the message buffer may be dropped. However, the new messages may include relevant information (e.g., security information). Dropping such messages may cause such information to be lost.

The present disclosure addresses the above-noted and other deficiencies by using a processing device to use token-bucket rate limiting to rate limit messages in a context-sensitive manner. For instance, repetitive and/or uninteresting messages may be rate limited (i.e., dropped), while non-repetitive and/or interesting messages may be sent from a kernel space of an OS to a user space of the OS. The processing device may obtain a message including a unique process identifier (UPID) and a message type. The processing device may determine whether the message type corresponds to a non-rate limited message type. If the message type corresponds to a non-rate limited message type, the processing device may send the message from the kernel space to the user space. The processing device may determine whether the UPID corresponds to a non-rate limited UPID. If the UPID corresponds to a non-rate limited UPID, the processing device may send the message from the kernel space to the user space. The processing device may determine whether an entry in a map (i.e., a data structure) exists based on the UPID and the message type of the message. If the entry does not exist in the map, the processing device may create an entry in the map with a key including the UPID and the message type and a value including a token count and a discrete time unit (described in greater detail below), and the processing device may send the message from the kernel space to the user space. If the entry exists in the map, that is, if the processing device determines that an entry exists with a key corresponding to the UPID and the message type of the message, the processing device may access a value of the entry, where the value includes a token count and a discrete time unit. The processing device may determine whether to drop the message in the kernel space or send the message from the kernel space to the user space based on processing (described in greater detail below) performed by the processing device on the token count and the discrete time unit. In some examples, the message may be used in the user space for cybersecurity related purposes.

In an example, a processing device obtains, in a kernel space of an operating system (OS), a message comprising a unique process identifier (UPID) and a message type. The processing device determines whether to send the message from the kernel space to a user space of the OS based on at least one of: the UPID, the message type, or a token count and a discrete time unit in an entry in a data structure in the kernel space. The processing device processes the message based on the determination of whether to send the message from the kernel space to the user space.

As discussed herein, the present disclosure provides an approach that improves the operation of a computer system by allowing rate limiting in an eBPF context in kernel space, which has a lower overhead compared to an overhead for rate limiting in user space. Furthermore, the present disclosure also improves the operation of a computer system by limiting an impact of dropped messages on the computer system so that a performance impact of the dropped messages is minimized while allowing most messages to be sent through from kernel space to user space. For instance, via determining whether to send the message from the kernel space to the user space of the OS based on at least one of: the UPID, the message type, or the token count and the discrete time unit in the entry in the data structure in the kernel space and processing the message based on the determination, the processing device may improve the operation of a computer system. In addition, the present disclosure provides an improvement to the technological field of cybersecurity by facilitating the transmission of messages relevant to security from kernel space to user space while dropping messages that are not relevant to security in the kernel space. For instance, via determining whether to send the message from the kernel space to the user space of the OS based on at least one of: the UPID, the message type, or the token count and the discrete time unit in the entry in the data structure in the kernel space and processing the message based on the determination, the processing device may improve the technological field of cybersecurity.

Figure 1:
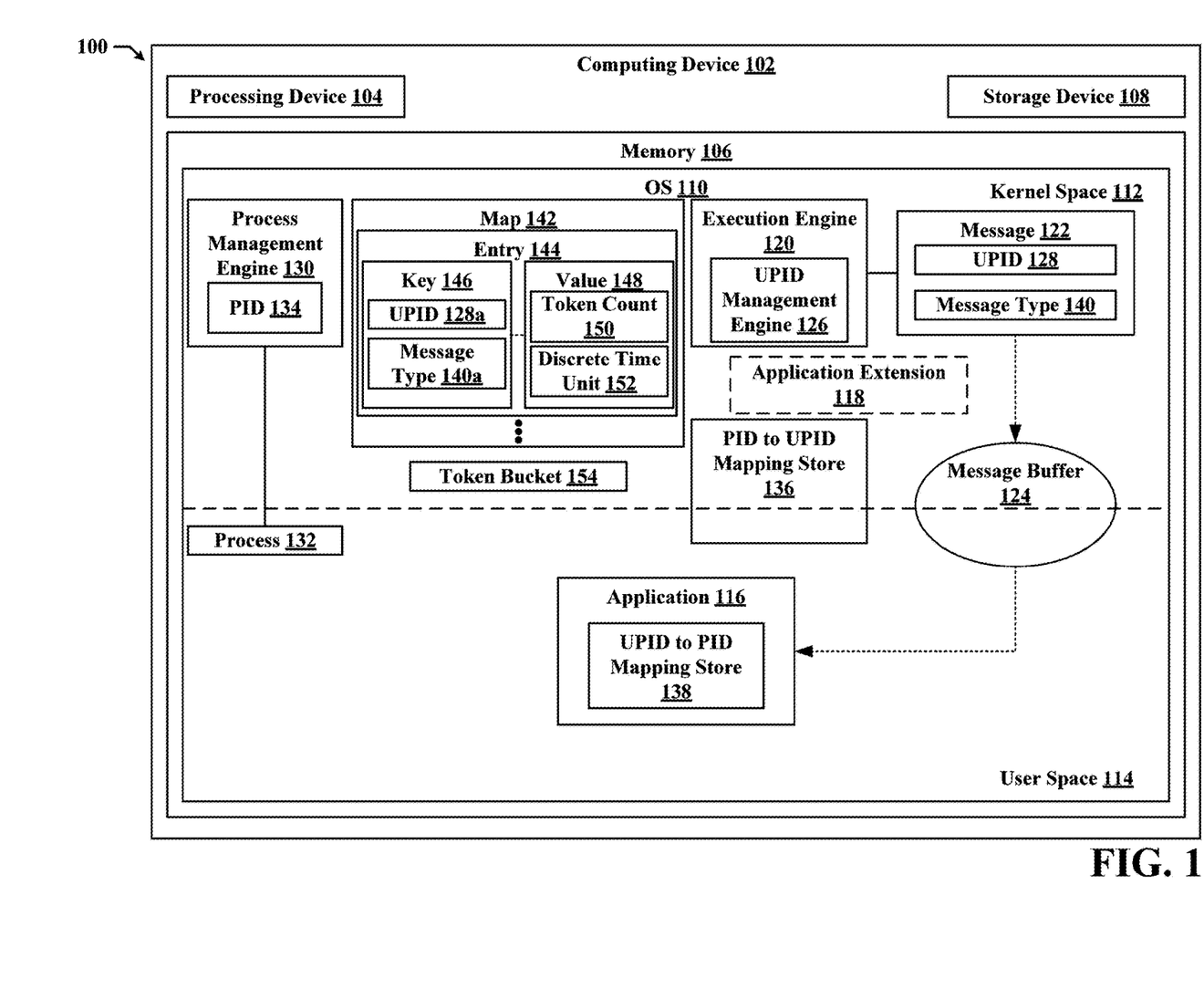
FIG. 1 is a block diagram that illustrates an example of a system for context-sensitive token-bucket rate limiting in an eBPF in accordance with some aspects of the present disclosure.

FIG. 1 is a block diagram 100 that illustrates an example of a system for context-sensitive token-bucket rate limiting in an eBPF in accordance with some aspects of the present disclosure. The system includes a computing device 102. In an example, the computing device 102 may be or include a desktop computing device, a laptop computing device, a tablet computing device, a smartphone, a gaming console, a server computing device, a wearable computing device, and/or an extended reality (XR) computing device. The computing device 102 includes a processing device 104 (e.g., processors, central processing units (CPUs), etc.) and memory 106 (e.g., random access memory (RAM). The computing device 102 may also include a storage device 108 (e.g., hard-disk drive (HDD)), solid-state drives (SSD), etc.). The computing device 102 may also include other hardware devices (e.g., a sound card, a video card, etc.). In an example, the computing device 102 may be or include the computer system 500 (or a portion thereof). In some examples, the computing device 102 may include a single machine or may include multiple interconnected machines (e.g., multiple servers configured in a cluster). The computing device 102 may be implemented by a common entity/organization or may be implemented by different entities/organizations In some aspects, the memory 106 may be non-uniform access (NUMA), such that memory access time depends on the memory location relative to processing device 104. It should be noted that although, for simplicity, a single processing device is depicted in the computing device 102 depicted in FIG. 1, other embodiments of the computing device 102 may include multiple processing devices, storage devices, and/or other devices.

The processing device 104 may include a complex instruction set computing (CISC) microprocessor, a reduced instruction set computing (RISC) microprocessor, a very long instruction word (VLIW) microprocessor, or a processor implementing other instruction sets or processors implementing a combination of instruction sets. The processing device 104 may also include one or more special-purpose processing devices such as an application specific integrated circuit (ASIC), a field programmable gate array (FPGA), a digital signal processor (DSP), network processor, or the like.

The storage device 108 may include a persistent storage that is capable of storing data. A persistent storage may be a local storage unit or a remote storage unit. Persistent storage may be a magnetic storage unit, an optical storage unit, a solid state storage unit, electronic storage units (main memory), or a similar storage unit. Persistent storage may also be a monolithic/single device or a distributed set of devices. In some aspects, the storage device 108 may be used to store computer instructions which may implement one or more operations described herein. For example, the storage device 108 may store the computer instructions, which may be loaded into the memory 106 and executed by the processing device 104.

The computing device 102 may execute an operating system (OS) 110. The OS 110 of computing device 102 may manage the execution of other components (e.g., software, applications, etc.) and/or may manage access to the hardware (e.g., the processing device 104, the memory 106, the storage device 108, etc.) of the computing device 102. The OS 110 may be software to provide an interface between the computing hardware (e.g., processing device 104 and/or the storage device 108) and applications running on the OS 110. The OS 110 may include a kernel space 112 and a user space 114, either or both of which can support the execution an application 116. Though only a single application (i.e., the application 116) is illustrated in FIG. 1, it will be understood that a plurality of applications may be present. The kernel space 112 may include several operating system functionalities, including but not limited to process management, hardware interfaces, access control and the like. Functions executing within the kernel space 112 may execute with an elevated privilege and may manage the administration of the OS 110. Examples of operating systems include WINDOWS™, LINUX™, ANDROID™, IOS™, and MACOS™.

The computing device 102 may execute (e.g., using the processing device 104) the application 116. The application 116 may be or include a desktop application, a network application, a security application, a database application, and/or any other application that may be executed by the OS 110. Portions of the application 116 executing within the user space 114 may execute with a reduced privilege as compared to operations performed within the kernel space 112, and may utilize standardized application programming interfaces (APIs), such as system calls, to access the functionality of the kernel space 112 of the OS 110. In some aspects, the application 116 may include functionality represented by an application extension 118 that is to be executed in the kernel space 112. The application extension 118 may be or include executable instructions that are provided by the application 116 to the kernel space 112 via an API, to be executed within the kernel space 112 utilizing the administrative privileges and/or access of the kernel space 112.

The application 116 may provide the application extension 118 to an execution engine 120 within the kernel space 112. In some aspects, the application extension 118 may be or include bytecode, though the embodiments of the present disclosure are not limited to such a configuration. In some aspects, bytecode includes object code that may be converted to machine code (e.g., binary instructions compatible with processing device 104) by the execution engine 120. In some aspects, the application 116 and/or the application extension 118 may include and/or be associated with a security monitoring application (e.g., an eBPF-based security monitoring application) that tracks activity across many processes.

The execution engine 120 may execute the application extension 118 within the context of the kernel space 112. For example, the execution engine 120 may execute the application extension 118 with the administrative privileges and access of the kernel space 112. This may allow the application extension 118 to perform privileged operations not available to the application 116 executing in user space 114. In some aspects, the execution engine 120 may be part of an eBPF infrastructure executing within the kernel space 112 and the application extension 118 may be eBPF-compatible bytecode.

In some aspects, while executing, the application extension 118 and/or the execution engine 120 may exchange a message 122 with the application 116 (e.g., the application extension 118 and/or the execution engine 120 may transmit the message 122 from the kernel space 112 to the user space 114). In some aspects, the message 122 may be exchanged utilizing a message buffer 124. The application extension 118 and/or the execution engine 120 may send the message 122 into the message buffer 124 for storage and the message 122 may be retrieved by the application 116. In some aspects, the message 122 may be stored in memory (e.g., the memory 106) allocated for the message buffer 124. In some aspects, the message buffer 124 may be a ring buffer. A ring buffer includes data structures that utilize a linear buffer in memory that is accessed as if it were connected end-to-end (e.g., circularly). In some aspects, a ring buffer may be accessed in a first-in-first-out (FIFO) manner.

The use of the message buffer 124 may allow the application extension 118 to exchange data and/or other message payloads with the application 116 using the message 122. For example, the application extension 118 may perform a monitoring function that is capable of analyzing processes that are created within the kernel space 112. The application extension 118 may be able to detect the creation of a process and inform the application 116 of the creation by using message 122.

A unique process identifier (UPID) management engine 126 may execute within the application extension 118 and/or the execution engine 120. The UPID management engine 126 may be configured to monitor process creation within the OS 110 and generate a UPID 128 to track the created process in a pseudo-unique manner. The UPID 128 may be included in the message 122. In some aspects, the UPID 128 may be a numeric value. In some aspects, the UPID 128 may be a 64-bit value. In an example, a process management engine 130 may execute within the kernel space 112 of the OS 110. The process management engine 130 may be a portion of the OS 110 responsible for creating, destroying, and/or tracking a process 132 (or processes) executing on the computing device 102. When a request is made to generate the process 132, the process management engine 130 may create the process 132 and generate a process identifier (PID) 134 that is to be associated with the process 132.

In some aspects, the PID 134 may be a PID that has been previously used for another process that has since been destroyed. For example, the process management engine 130 may maintain uniqueness for PIDs for the currently executing processes of the OS 110, but once a process exits and/or is destroyed, the PID for that process may be reused. In order to generate a pseudo-unique UPID (e.g., the UPID 128) that may be unique over a longer period of time, the application extension 118 may be configured to generate a UPID for each process created by the process management engine 130.

As part of generating the UPID 128, the UPID management engine 126 may maintain a process identifier to unique process identifier (PID-to-UPID) mapping store 136 that maps PIDs to UPIDs (e.g., a PID-to-UPID mapping). In some aspects, the PID-to-UPID mapping may allow for executing code instructions that have a value of a PID (e.g., the PID 134) to retrieve the value of a UPID (e.g., the UPID 128) that corresponds to the PID. In some aspects, the PID-to-UPID mapping store 136 may be a portion of memory that is accessible by the application 116 in the user space 114. In some aspects, the PID-to-UPID mapping store 136 may be an array that is indexed by a value of the PID 134. In some aspects, the PID-to-UPID mapping store 136 may be a binary tree. Because the UPID management engine 126 is executing in kernel space 112, the UPID management engine 126 may have inline access to process creation and may be able to quickly detect the creation of new processes and their associated PIDs. The PID-to-UPID mapping store 136 may be relatively simple to maintain, and therefore may not require excessive computational power or memory space. In some aspects, the PID-to-UPID mapping store 136 may be formed in a portion of memory (e.g., the memory 106 of FIG. 1) that is accessible to the user space 114. For example, the PID-to-UPID mapping store 136 may be formed in a memory-mapped area that the application 116 may either directly address or address via an API. Therefore, the application 116 may be able to utilize values of the PID-to-UPID mapping store 136 created by the UPID management engine 126.

The application 116 may generate a UPID-to-PID mapping that maps a UPID (e.g., the UPID 128) to a PID (e.g., the PID 134), and place the UPID-to-PID mapping within a UPID-to-PID mapping store 138. In some aspects, the UPID-to-PID mapping may allow for executing code instructions that have a value of a UPID to retrieve the value of a PID that corresponds to the UPID. In some aspects, the UPID-to-PID mapping store 138 may be maintained separately from, and in a different format, from the PID-to-UPID mapping store 136. In some embodiments, the UPID-to-PID mapping store 138 may be a sorted tree that utilizes a UPID (e.g., the UPID 128) to identify a leaf of a tree that contains a PID (e.g., the PID 134). For example, the UPID-to-PID mapping store 138 may be implemented as an AVL tree. An AVL tree (named after inventors Adelson-Velsky and Landis) is a self-balancing binary search tree (BST). In an example embodiment utilizing an AVL tree, the heights of the two child subtrees of any node of the UPID-to-PID mapping store 138 differ by at most one. If the heights of the two child subtrees differ by more than one, rebalancing may be performed on the UPID-to-PID mapping store 138 to restore this property. Lookup, insertion, and deletion to the UPID-to-PID mapping store 138 may take O (log n) time in both the average and worst cases, where n is the number of nodes in the UPID-to-PID mapping store 138 prior to the operation. Insertions and deletions may require the UPID-to-PID mapping store 138 to be rebalanced by one or more tree rotations. Thus, given a particular value for the UPID, the PID may be quickly determined.

Though an AVL tree is described as an example for the UPID-to-PID mapping store 138, it is an example only, and not intended to limit the embodiments of the present disclosure. It will be understood that other formats, trees, or mapping mechanisms may be used for the UPID-to-PID mapping store 138 without deviating from the embodiments of the present disclosure.

The operations of the application 116 with respect to the creation and/or maintenance of the UPID-to-PID mapping store 138 may be performed asynchronously with respect to the operations of the UPID management engine 126. Thus, the UPID management engine 126 may be able to perform time-sensitive operations related to the creation of a process (e.g., the process 132) and an associated PID (e.g., the PID 134) so as to create a UPID (e.g., the UPID 128) to track the new PID. The finalization of the UPID-to-PID mapping, which may include operations to rebalance the UPID-to-PID mapping store 138, may be performed as a lazy update, thus reducing the number of operations performed in the kernel space 112, which may be resource and/or performance sensitive.

As indicated above, the computing device 102 may track activity across processes (e.g., the process 132) using UPIDs (e.g., the UPID 128). For example, the computing device 102 may track activity in the kernel space 112. When activity in the kernel space 112 occurs, the execution engine 120 (and/or the application extension 118) may generate and send messages (e.g., the message 122) from the kernel space 112 to the user space 114. However, in certain environments (e.g., highly concurrent environments with large numbers of processes) a relatively large amount of messages may be generated, which increase an amount of overhead to process the messages. As the message buffer 124 has a fixed size, the message buffer 124 may drop messages once the message buffer 124 is full. This may cause security information of interest to be lost. Aspects presented herein pertain to using token-bucket rate limiting to rate limit messages (e.g., eBPF messages) in a context-sensitive manner that allows relevant messages to be sent from the kernel space 112 to the user space 114 while dropping messages that are less relevant.

In an example, as part of tracking the process 132, the execution engine 120 and/or the application extension 118 generate the message 122 in the kernel space 112, where the message 122 corresponds to the process 132. The message 122 includes the UPID 128 (described above) for the process 132 and a message type 140 (i.e., a type of the message 122). In an example, the message type 140 may be or include "file created," "process exited," "process created," or "network socket opened."

The execution engine 120 and/or the application extension 118 may maintain a map 142 (e.g., a data structure) in the kernel space 112. The map 142 may alternatively be referred to as an "eBPF map" or a "rate limit map." The map 142 may include an entry 144. The entry 144 may include a key 146 and a value 148 corresponding to the key 146. The key 146 may include a UPID 128a and a message type 140a, where the UPID 128 and the message type 140a correspond to a message. In some aspects, the UPID 128 and the message type 140a of the key 146 may form a tuple.

The value 148 may include a token count 150 and a discrete time unit 152. The token count 150 may be a count of tokens in a token bucket 154 maintained in the kernel space 112. The discrete time unit 152 (which may also be referred to as a "tick") is a time value generated by a monotonic clock (not illustrated in FIG. 1) divided by a time period. A monotonic clock may refer to a time source that only increments and that does not jump forwards or backwards. Between each discrete time unit, one token may be added to the token bucket 154. The discrete time unit 152 may correspond to a discrete time unit at which the entry 144 was last updated. In some aspects, the token count 150 and the discrete time unit 152 of the value 148 may form a tuple. Although not depicted in FIG. 1, the map 142 may include entries other than the entry 144, where each entry in the entries may include a key including a UPID and a message type and a value including a token count and a discrete time unit.

As indicated above, the execution engine 120 and/or the application extension 118 may track the process 132 and generate the message 122 corresponding to the process 132 in the kernel space 112 of the OS 110, where the message 122 includes the UPID 128 and the message type 140. The execution engine 120 and/or the application extension 118 may determine whether or not to send the message 122 from the kernel space 112 to the user space 114 (e.g., via the message buffer 124) based on one or more factors.

In some aspects, the execution engine 120 and/or the application extension 118 may maintain a list of message types (not depicted in FIG. 1) in the kernel space 112 that are not to be rate limited (i.e., not to be dropped). If the list of message types includes/indicates the message type 140 of the message 122, the execution engine 120 and/or the application extension 118 may send the message 122 from the kernel space 112 to the user space 114 via the message buffer 124. If the list of message types does not include/indicate the message type 140, the execution engine 120 and/or the application extension 118 may perform further processing on the message 122 to determine whether or not to send the message 122 from the kernel space 112 to the user space 114.

In some aspects, the execution engine 120 and/or the application extension 118 may maintain a list of UPIDs (not depicted in FIG. 1) in the kernel space 112 that are not to be rate limited (i.e., not to be dropped). If the list of UPIDs includes/indicates the UPID 128 of the message 122, the execution engine 120 and/or the application extension 118 may send the message 122 from the kernel space 112 to the user space 114 via the message buffer 124. If the list of UPIDs does not include/indicate the UPID 128, the execution engine 120 and/or the application extension 118 may perform further processing on the message 122 to determine whether or not to send the message 122 from the kernel space 112 to the user space 114.

In some aspects, the execution engine 120 and/or the application extension 118 may determine whether an entry corresponding to the message 122 exists in the map 142 to determine whether or not to send the message 122 from the kernel space 112 to the user space 114. For example, the execution engine 120 and/or the application extension 118 may use the UPID 128 and the message type 140 as a key to access the map 142.

In an example, if the execution engine 120 and/or the application extension 118 determine that the map 142 does not include a key corresponding to the UPID 128 and the message type 140, the execution engine 120 and/or the application extension 118 may create the entry 144 in the map 142, where the entry 144 includes the key 146 that includes the UPID 128a (which corresponds to the UPID 128) and the message type 140a (which corresponds to the message type 140) and the value 148 that includes the token count 150 and the discrete time unit 152 (described above). The token count 150 may be equal to a maximum token count of the token bucket 154 minus one and the discrete time unit 152 may be equal to a current time from a monotonic clock divided by a time period. The execution engine 120 and/or the application extension 118 may then send the message 122 from the kernel space 112 to the user space 114 via the message buffer 124 concurrently with or subsequent to creating the entry 144.

In another example, the execution engine 120 and/or the application extension 118 determine that the map 142 already includes the entry 144, and as such, the UPID 128a corresponds to (e.g., is equal to, is equivalent to, etc.) the UPID 128 of the message 122 and the message type 140a corresponds to (e.g., is equal to, is equivalent to, etc.) the message type 140 of the message 122. In such an example, the execution engine 120 and/or the application extension 118 determine that the entry 144 corresponds to the message 122. For instance, the execution engine 120 and/or the application extension 118 may utilize the UPID 128 and the message type 140 as a key to access the value 148 of the entry 144, where the value 148 includes the token count 150 and the discrete time unit 152. The token count 150 and the discrete time unit 152 correspond to a most recent token count and a most recent discrete time unit, respectively, associated with the message 122.

The execution engine 120 and/or the application extension 118 may perform processing on the token count 150 and the discrete time unit 152 to determine whether or not to send the message 122 from the kernel space 112 to the user space 114. For example, the execution engine 120 and/or the application extension 118 may access the discrete time unit 152 from the entry 144. The execution engine 120 and/or the application extension 118 may compute a difference between a current discrete time unit (i.e., a current time from a monotonic clock divided by a time period) and the discrete time unit 152 of the entry 144. The execution engine 120 and/or the application extension 118 may compute a new token count as the token count 150 plus the difference. The execution engine 120 and/or the application extension 118 may clamp the new token count to a range of [0, maximum token count of the token bucket 154 minus the token count 150], inclusive, that is, if the new token count is less than zero after setting the range of the new token count as described above, the new token count may be set to zero, and if the new token count is greater than the maximum token count of the token bucket 154 minus the token count 150 as described above, the new token count may be set to the maximum token count of the token bucket 154 minus the token count 150. If the new token count is greater than or equal to zero and less than or equal to the maximum token count of the token bucket 154 minus the token count 150, the new token count may remain unchanged. The aforementioned setting of the new token count may ensure that an appropriate number of tokens are added based on an elapsed time, removing one token since the message 122 was generated, and ensuring that the new token count stays within a range of the token bucket 154. The execution engine 120 and/or the application extension 118 may then perform an atomic add operation to set the token count 150 to be equal to the token count 150 plus the new token count minus one (i.e., token count 150=atomic_add (token count 150+ new token count-1)). If the token count 150 is equal to zero after performing the aforementioned atomic add operation, the execution engine 120 and/or the application extension 118 may drop the message 122. If the token count 150 is not equal to zero after performing the aforementioned atomic add operation, the execution engine 120 and/or the application extension 118 may send the message 122 from the kernel space 112 to the user space 114 via the message buffer 124.

An eBPF-based security monitoring application may be implemented to track activity across many processes using a UPID. When activity from a kernel space of an OS occurs, a message may be sent from the kernel space to a user space of the OS. In highly concurrent environments, an amount of messages sent may become relatively large, which may increase an amount of overhead and which may cause a performance impact to process the messages. One solution to reduce the amount of overhead and the performance impact would be to rate limit (i.e., drop) messages. However, dropping random messages may cause important security contexts and/or tracking information to be lost. With more particularity, eBPF messages may be stored in a ring buffer that has a fixed size. When the ring buffer is full, incoming eBPF messages may be dropped, which may cause important information to be lost.

Described herein are various technologies pertaining to token-bucket rate limiting that rate limits eBPF messages in a context-sensitive manner. Specifically, the technologies described herein rate limit uninteresting/repetitive messages while letting other message pass through to user space unblocked. The technologies described herein may utilize a UPID and a message type to achieve the aforementioned rate limiting and pass through. A UPID may refer to an identifier that is assigned uniquely to every process tracked on a computing system/device. A message type may refer to a unique type corresponding to a type of message types. Message types may include "file created," "process exited," "network socket opened," etc. Each type of message may be assigned a distinct message type.

The technologies described herein may also utilize an eBPF map. An eBPF map may refer to a data structure that associates together a key and a value. The eBPF map may also be referred to as a rate limit map. The eBPF map may include, as a key, a tuple of (UPID, message type) and a corresponding value that is a tuple of (token count, last tick). A tick (i.e., a discrete time unit) may refer to a manner of discretizing time. A tick may be a time value (e.g., obtained from a monotonic clock) divided by a time period. Between each tick, one token may be added to each token bucket. In an example, a function designated as "current_token_tick( )" may return a monotonic time divided by a time period.

As indicated above, each message (e.g., each eBPF message) sent may have a UPID and a message type. A processing device may decide whether or not to drop the message based on the following pseudocode. First, the processing device determines whether the message is of a type that is to be rate limited. If the message not to be rate limited, the message may be sent immediately from kernel space to user space. For instance, some message types may be important such that they should not be rate limited. Second, the processing device determines if the UPID corresponds to a UPID that is to be rate limited. If the UPID is not to be rate limited, the message may be sent immediately from kernel space to user space. For instance, some processes may be important and should not be rate limited.

Third, the eBPF map may be checked for a tuple (UPID, message type). There are two cases. In a first case, there is no entry with the tuple in the eBPF map. In such a case, a new entry is created with key (UPID, message type) and value (MAX_TOKEN_COUNT−1, current_token_tick( )). In an example, "MAX_TOKEN_COUNT" may be the maximum token count of the token bucket 154. The message may then be sent from kernel space to user space. In a second case, there is an entry with the tuple in the eBPF map. In such a case, a last tick value in the entry is checked. A delta is computed between current_token_tick( ) and the last tick value. A new token count may be computed as new token count=token count+delta. A range of the new token count may be clamped to a range of range [0, MAX_TO- KEN_COUNT–token count]. This may have an effect of adding an appropriate number of tokens based on time elapsed, removing one token since the message was just sent, and ensuring that the token count stays in the range [0, MAX_TOKEN_COUNT-token count] (the token bucket range). An atomic add operation may be performed to set the token count to be equal to the token count plus the new token count minus one. After this is performed, if the number of tokens (i.e., the token count) equals zero, the message is dropped, otherwise, the message is sent from kernel space to user space. In some aspects, memory races may be possible and may be handled appropriately, as eBPF may not allow for general-purpose locking techniques.

The technologies described herein may be associated with various advantages. For example, the technologies described herein may allow for rate limiting with eBPF, which may have a lower overhead than rate limiting in user space, since performing context switches in user space may have a performance cost. The technologies described herein may decrease ring buffer utilization due to message rate limiting. The technologies described herein may allow for some messages or processes to be exempt from rate limiting if desired. The technologies described herein may rate limit messages in a manner that limits an impact of dropped messages on other parts of a system so that a performance impact of the messages on the overall system is minimized; however, most messages may not be impacted and may be allowed to be sent from kernel space to user space. This may help to minimize a chance that message dropping occurs and valuable security context is lost. The technologies described herein may also centralize rate limiting code so that code calling into message processing may be handled automatically. This may enable complex rate limiting logic to be written once and put into one place. As indicated above, the technologies described herein employ rate limiting using the concepts of UPID and message type in eBPF code. Other types of rate limiting may either risk losing valuable security context or more require more powerful constructs lacked by eBPF (e.g., a periodic worker thread).

In some aspects described herein, a message rate limiting process is described. With more particularity, in order to prevent the overloading of eBPF ring buffers, outgoing messages may be subject to rate limiting on a BPF (or an eBPF) side. Message rate limiting may be implemented using a token-bucket algorithm indexed by (UPID, message type). Each (UPID, message type) tuple may be assigned a certain number of message before messages are rate limited (further messages are dropped as long as a rate limit is exceeded). The pseudocode below for a token-bucket may be run on every attempt to add to an eBPF ring buffer. The variable "budget," which is a per-minute rate limit (e.g., a budget of one-hundred means that one-hundred messages per minute are allowed). A map with key (UPID, message type) and value (timestamp expressed in abstract tick unit, token count) may be utilized in the pseudocode below.

If a message type (i.e., message type) is not rate limited (exec/exit/error0, return "not ratelimited."

Check a rate limit map for a (UPID, message type) tuple. If the rate limit map for the (UPID, message type) tuple does exist, add a new entry to the rate limit map with initial (tokens=budget–1, timestamp ticks=now) and return "not rate limited" (the "–1" is to reflect the message removing one token from a full bucket size).

Compute a number of tokens that are to be added to a bucket. Added tokens=current timestamp ticks-last timestamp ticks. A tick may refer to an amount of time for a bucket to be assigned exactly one token (i.e., 60 seconds).

Removed tokens=–1 (to account for the message being sent). Add current timestamp ticks-last timestamp tickets–1 tokens to the bucket.

Clamp the number of tokens to be within the range [0, budget).

If the number of tokens is zero, return "rate limited."

Although the description here focuses on implementing rate limiting in kernel mode (i.e., in kernel space), other possibilities are contemplated. For example, rate limiting similar to that described herein may be implemented in user mode (i.e., user space).

Figure 2:
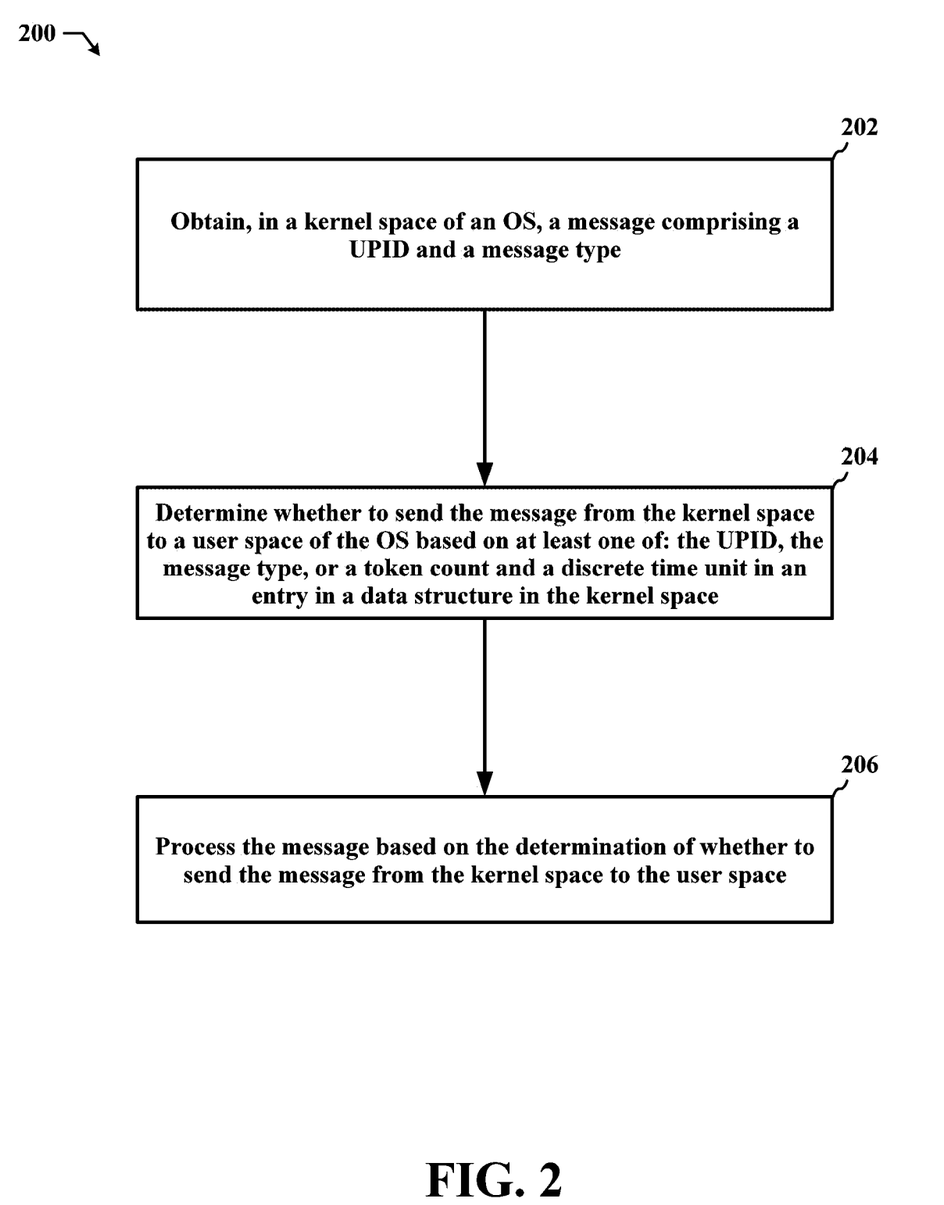
FIG. 2 is a flow diagram of a method of context-sensitive token-bucket rate limiting in an eBPF in accordance with some aspects of the present disclosure.

FIG. 2 is a flow diagram 200 of a method for context-sensitive token-bucket rate limiting in an eBPF in accordance with some aspects of the present disclosure. The method may be performed by processing logic that may include hardware (e.g., a processing device), software (e.g., instructions running/executing on a processing device), firmware (e.g., microcode), or a combination thereof. In some aspects, at least a portion of the method may be performed by the processing device 104 (shown in FIG. 1), the execution engine 120 (shown in FIG. 1), the application extension 118 (shown in FIG. 1), the processing device 404 (shown in FIG. 4), the processing device 502 (shown in FIG. 5), or a combination thereof.

The method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

At block 202, a processing device obtains, in a kernel space of an OS, a message comprising a UPID and a message type. In an example, the kernel space may be or include the kernel space 112, the OS may be or include the OS 110, the UPID may be or include the UPID 128, and the message type may be or include the message type 140. In another example, the kernel space may be or include the kernel space 409, the OS may be or include the OS 410, the UPID may be or include the UPID 414, and the message type may be or include the message type 416.

At block 204, the processing device determines whether to send the message from the kernel space to a user space of the OS based on at least one of: the UPID, the message type, or a token count and a discrete time unit in an entry in a data structure in the kernel space. In an example, the user space may be or include the user space 114, the token count may be or include the token count 150, the discrete time unit may be or include the discrete time unit 152, the entry may be or include the entry 144, and the data structure may be or include the map 142. In another example, the user space may be or include the user space 418, the token count may be or include the token count 420, the discrete time unit may be or include the discrete time unit 422, the entry may be or include the entry 424, and the data structure may be or include the data structure 426.

At block 206, the processing device processes the message based on the determination of whether to send the message from the kernel space to the user space. For example, the processing device may drop the message in the kernel space or send the message from the kernel space to the user space based on the determination.

Figure 3:
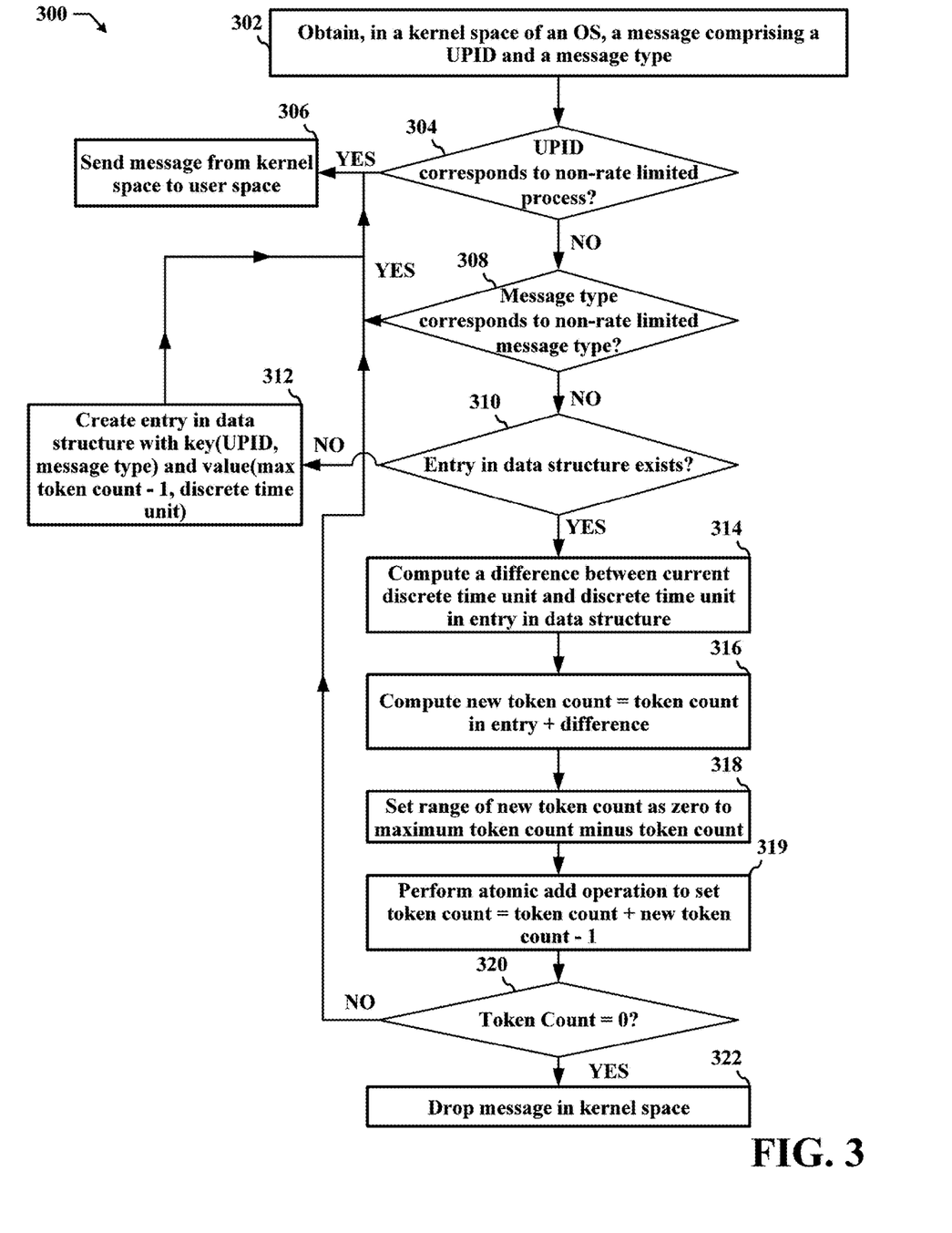
FIG. 3 is a flow diagram of a method of context-sensitive token-bucket rate limiting in an eBPF in accordance with some aspects of the present disclosure.

FIG. 3 is a flow diagram 300 of a method for context-sensitive token-bucket rate limiting in an eBPF in accordance with some aspects of the present disclosure. The method may be performed by processing logic that may include hardware (e.g., a processing device), software (e.g., instructions running/executing on a processing device), firmware (e.g., microcode), or a combination thereof. In some aspects, at least a portion of the method may be performed by the processing device 104 (shown in FIG. 1), the execution engine 120 (shown in FIG. 1), the application extension 118 (shown in FIG. 1), the processing device 404 (shown in FIG. 4), the processing device 502 (shown in FIG. 5), or a combination thereof.

The method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

At block 302, a processing device obtain, in a kernel space of an OS, a message comprising a UPID and a message type. In an example, the kernel space may be or include the kernel space 112, the OS may be or include the OS 110, the UPID may be or include the UPID 128, and the message type may be or include the message type 140. In another example, the kernel space may be or include the kernel space 409, the OS may be or include the OS 410, the UPID may be or include the UPID 414, and the message type may be or include the message type 416.

The processing device determines whether to send the message from the kernel space to a user space of the OS based on at least one of: the UPID, the message type, or a token count and a discrete time unit in an entry in a data structure in the kernel space. In an example, the user space may be or include the user space 114, the token count may be or include the token count 150, the discrete time unit may be or include the discrete time unit 152, the entry may be or include the entry 144, and the data structure may be or include the map 142. In another example, the user space may be or include the user space 418, the token count may be or include the token count 420, the discrete time unit may be or include the discrete time unit 422, the entry may be or include the entry 424, and the data structure may be or include the data structure 426. The processing device processes the message based on the determination of whether to send the message from the kernel space to the user space.

In some aspects, determining whether to send the message may include, at block 304, determining whether the UPID included in the message corresponds to a non-rate limited process. Upon positive determination that the UPID included in the message corresponds to the non-rate limited process, at block 306, the processing device sends the message from the kernel space to the user space.

Upon negative determination that the UPID included in the message corresponds to the non-rate limited process, determining whether to send the message may include, at block 308, determining whether the message type included in the message corresponds to a non-rate limited message type. Upon positive determination that the message type included in the message corresponds to the non-rate limited message type, at block 306, the processing device sends the message from the kernel space to the user space.

Upon negative determination that the message type included in the message corresponds to the non-rate limited message type, determining whether to send the message may include, at block 310, determining whether an entry corresponding to the message exists in the data structure. Upon negative determination that the entry corresponding to the message exists in the data structure, at block 312, the processing device may create the entry in the data structure. The entry may include a key that includes the UPID and the message type included in the message. The entry may include a value that includes a token count and a discrete time unit. The token count may be equal to a maximum token count of a token bucket (e.g., the token bucket 154) minus one. The discrete time unit may be equal to a current time from a monotonic clock divided by a time period. Subsequent to or concurrently with creating the entry in the data structure, at block 306, the processing device may send the message from the kernel space to the user space.

Upon positive determination that the entry corresponding to the message exists in the data structure, at block 314, the processing device may compute a difference between a current discrete time unit (i.e., a current time from a monotonic clock divided by a time period) and a discrete time unit included in the entry in the data structure.

At block 316, the processing device may compute a new token count as the token count from the entry plus the difference (computed at block 314). The processing device may set the token count of the entry to be equal to the new token count.

At block 318, the processing device may set a range of the new token count to be [0, maximum token count of token bucket-token count]. For instance, if the new token count (computed at block 316) is less than zero, the processing device may set the new token count in the entry in the data structure to be zero. If the new token count (computed at block 316) is greater than the maximum token count of the token bucket minus the token count, the processing device may set the new token count to be the maximum token count of the token bucket minus the token count. If the new token count (computed at block 316) is greater than or equal to zero and less than or equal to the maximum token count of the token bucket minus the token count, the processing device may not adjust a value of the new token count.

At block 319, the processing device may perform an atomic add operation to set the token count to be equal to the token count plus the new token count minus one.

In some aspects, determining whether to send the message may include, at block 320, determining whether the token count (in the entry) is equal to zero. Upon negative determination that the token count is equal zero (i.e., upon determining that the token count is non-zero), at block 306, the processing device sends the message from the kernel space to the user space. Upon positive determination that the token count is equal to zero, at block 322, the processing device drops the message in the kernel space, that is, the processing device may not send the message from the kernel space to the user space.

In some aspects, transmitting the message from the kernel space to the user space based on the determination may include sending the message to a ring buffer. In an example, the ring buffer may be or include the message buffer 124.

In some aspects, the discrete time unit may be equal to a time value from a monotonic clock divided by a time period.

In some aspects, the message may include an extended Berkeley packet filter (eBPF) message.

In some aspects, the message type may include at least one file created, process created, or network socket opened.

In some aspects, the UPID may be associated with a process identifier of a process executing in the OS. In an example, the processing identifier may be or include the PID 134 and the process may be or include the process 132.

Figure 4:
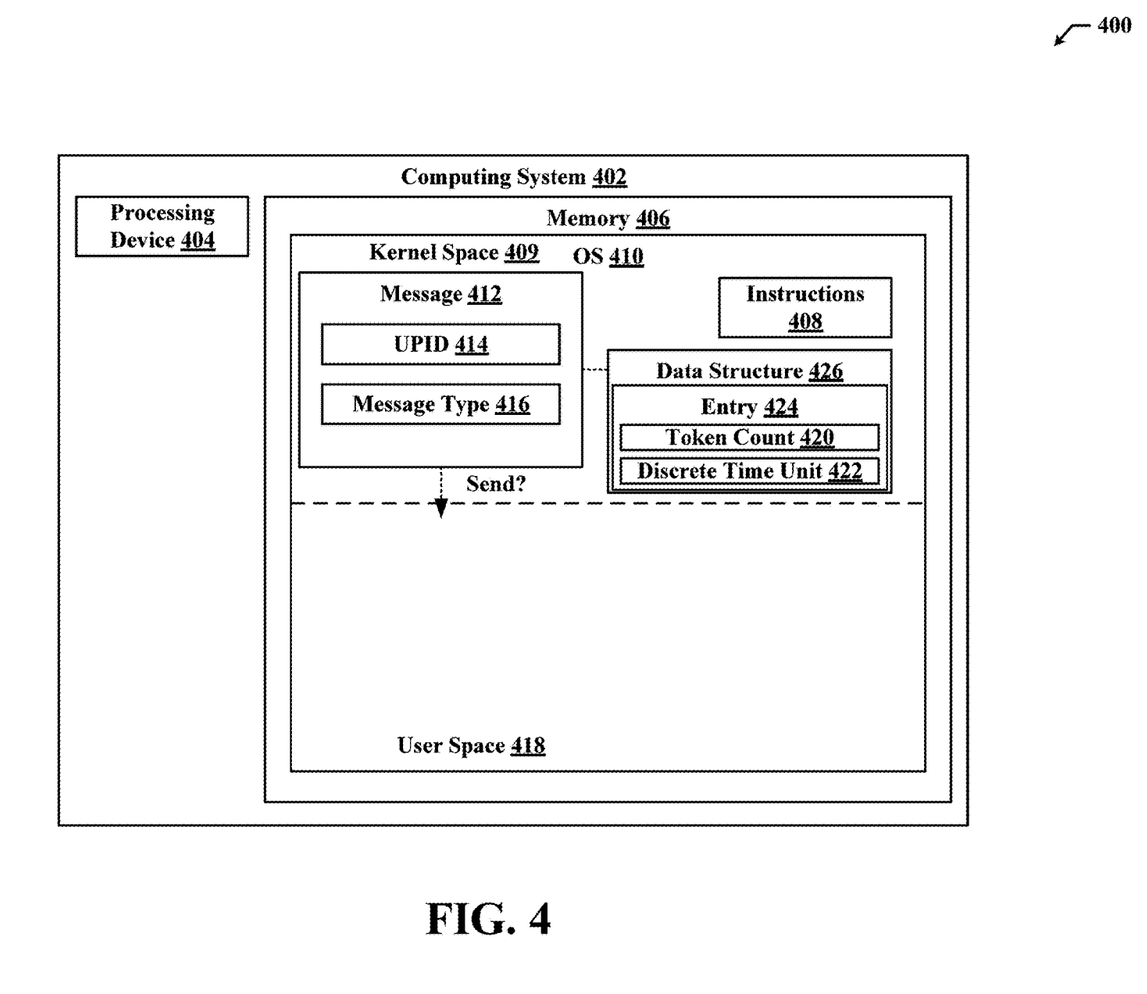
FIG. 4 is a block diagram that illustrates an example of a system for context-sensitive token-bucket rate limiting in an eBPF in accordance with some aspects of the present disclosure.

FIG. 4 is a block diagram 400 that illustrates an example of a computing system 402 for context-sensitive token-bucket rate limiting in an eBPF in accordance with some aspects of the present disclosure. In some aspects, the computing system 402 may perform some or all of the functionality described herein. The computing system 402 includes a processing device 404 and memory 406. The memory 406 stores instructions 408 that are executed by the processing device 404. The instructions 408, when executed by the processing device 404, cause the processing device 404 to obtain, in a kernel space 409 of an OS 410, a message 412 comprising a UPID 414 and a message type 416. The instructions 408, when executed by the processing device 404, cause the processing device 404 to determine whether to send the message 412 from the kernel space 409 to a user space 418 of the OS 410 based on at least one of: the UPID 414, the message type 416, or a token count 420 and a discrete time unit 422 in an entry 424 in a data structure 426 in the kernel space 409. The instructions 408, when executed by the processing device 404, cause the processing device 404 to process the message 412 based on the determination of whether to send the message 412 from the kernel space 409 to the user space 418.

Figure 5:
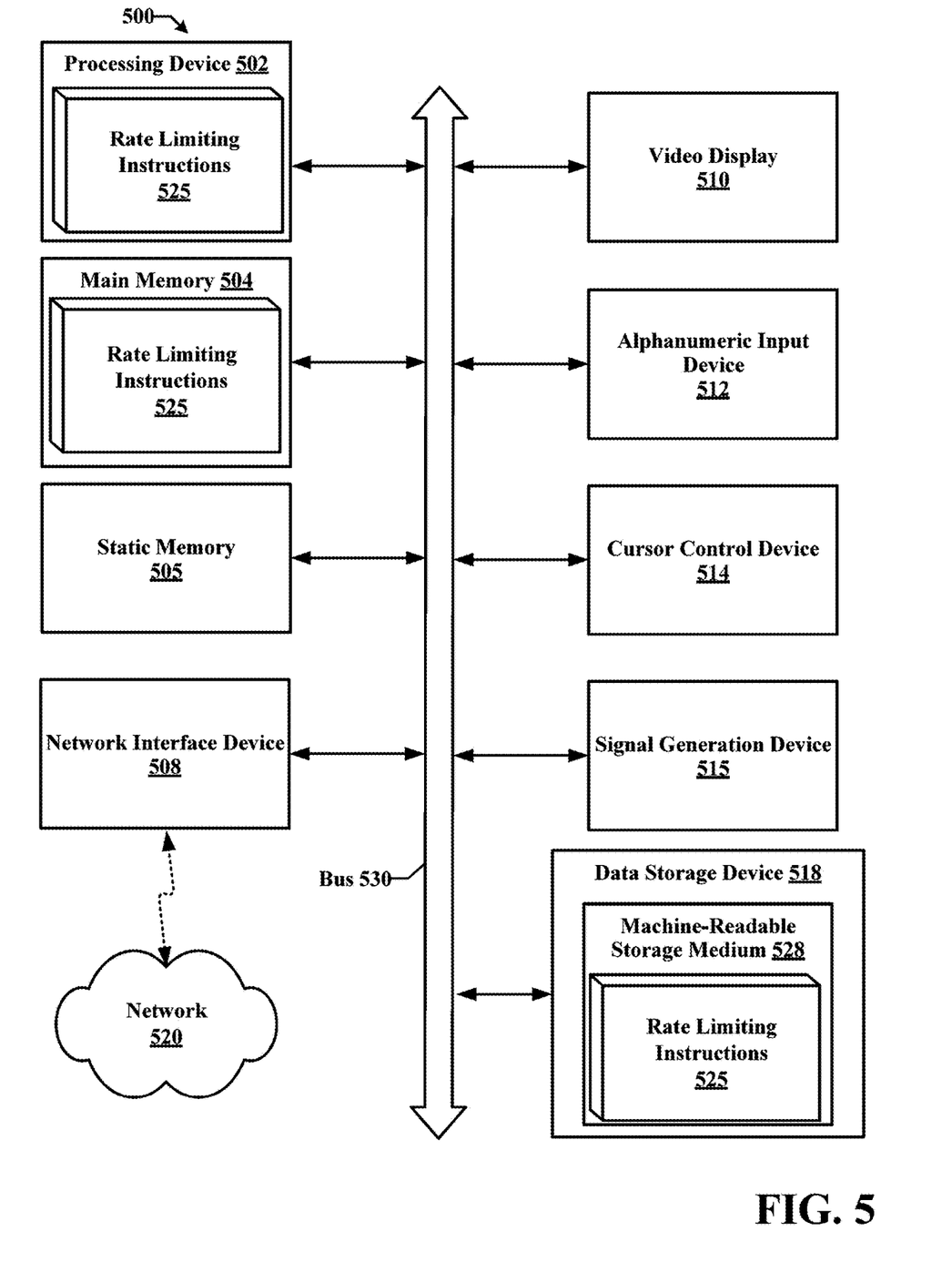
FIG. 5 illustrates a diagrammatic representation of a machine in an example form of a computer system that may perform one or more of the operations described herein in accordance with some aspects of the present disclosure.

FIG. 5 illustrates a diagrammatic representation of a machine in the example form of a computer system 500 within which a set of instructions, for causing the machine to perform any one or more of the methodologies discussed herein for context-sensitive token-bucket rate limiting in an eBPF program.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, the computer system 500 may be representative of a server.

The computer system 500 includes a processing device 502, a main memory 504 (e.g., read-only memory (ROM), flash memory, dynamic random access memory (DRAM), a static memory 505 (e.g., flash memory, static random access memory (SRAM), etc.), and a data storage device 518 which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

The computer system 500 may further include a network interface device 508 which may communicate with a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 515 (e.g., an acoustic signal generation device, such as a speaker). In some embodiments, the video display unit 510, the alphanumeric input device 512, and the cursor control device 514 may be combined into a single component or device (e.g., an LCD touch screen).

The processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute rate limiting instructions 525, for performing the operations and steps discussed herein. For example, the rate limiting instructions 525 may include instructions for obtaining, in a kernel space of an operating system (OS), a message comprising a unique process identifier (UPID) and a message type. The rate limiting instructions 525 may include instructions for determining whether to send the message from the kernel space to a user space of the OS based on at least one of: the UPID, the message type, or a token count and a discrete time unit in an entry in a data structure in the kernel space. The rate limiting instructions 525 may include instructions for processing the message based on the determination of whether to send the message from the kernel space to the user space.

The data storage device 518 may include a machine-readable storage medium 528 that stores the rate limiting instructions 525 (e.g., software) embodying any one or more of the methodologies of functions described herein. The rate limiting instructions 525 may also reside, completely or at least partially, within the main memory 504 or within the processing device 502 during execution thereof by the computer system 500; the main memory 504 and the processing device 502 also constituting machine-readable storage media. The rate limiting instructions 525 may further be transmitted or received over a network 520 via the network interface device 508.

While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "obtaining," "determining," "processing," "sending," "transmitting," "receiving," "identifying," "selecting," "creating," "generating," "computing," "calculating," "setting," "dropping," "looking up," "filtering," "discarding," "inputting," "outputting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission, or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method, comprising:
    obtaining, in a kernel space of an operating system (OS), a message comprising a unique process identifier (UPID) and a message type;
    determining that an entry does not exist in a data structure in the kernel space;
    creating the entry in the data structure based on the determination that the entry does not exist in the data structure, wherein the entry comprises:
        a key comprising the UPID and the message type; and
        a value comprising a token count and a discrete time unit:
    determining, by a processing device, to send the message from the kernel space to a user space of the OS based on at least one of:
        the UPID,
        the message type, or
        the token count and the discrete time unit in the entry in the data structure in the kernel space, wherein the determining to send the message is additionally based on the determination that the entry did not exist in the data structure prior to the creating the entry; and
    transmitting the message from the kernel space to the user space based on the determination to send the message from the kernel space to the user space.

2. The method of claim 1, wherein the determining to send the message from the kernel space to the user space comprises determining to send the message from the kernel space to the user space based on the UPID corresponding to a non-rate limited process.

3. The method of claim 1, wherein the determining to send the message from the kernel space to the user space comprises determining to send the message from the kernel space to the user space based on the message type corresponding to a non-rate limited message type.

4. The method of claim 1, wherein the transmitting the message from the kernel space to the user space comprises sending the message to a ring buffer.

5. The method of claim 1, wherein the discrete time unit is equal to a time value from a monotonic clock divided by a time period.

6. The method of claim 1, wherein the message comprises an extended Berkeley packet filter (eBPF) message.

7. The method of claim 1, wherein the message type includes at least one of:
  file created,
  process created, or
  network socket opened.

8. The method of claim 1, wherein the UPID is associated with a process identifier of a process executing in the OS.

9. A system, comprising:
  a processing device; and
  a memory coupled to the processing device, the processing device to:
    obtain, in a kernel space of an operating system (OS), a message comprising a unique process identifier (UPID) and a message type;
    determine that an entry in a data structure in the kernel space exists based on the UPID and the message type corresponding to a key in the data structure;
    determine to send the message from the kernel space to a user space of the OS based on at least one of:
      the UPID,
      the message type, or
      a token count and a discrete time unit in the entry in the data structure in the kernel space,
    wherein to determine to send the message from the kernel space to the user space, the processing device is to:
      compute a difference between a current discrete time unit and the discrete time unit in the entry;
      compute a new token count as a sum of the token count and the difference;
      set a range of a token bucket associated with the new token count as zero to a maximum token count minus the token count, inclusive;
      perform an atomic add operation to set the token count to be equal to the token count plus the new token count minus one; and
      determine to send the message from the kernel space to the user space based on the token count being non-zero; and
    transmit the message from the kernel space to the user space based on the determination to send the message from the kernel space to the user space.

10. The system of claim 9, wherein the discrete time unit is equal to a time value from a monotonic clock divided by a time period.

11. The system of claim 9, wherein the message comprises an extended Berkeley packet filter (eBPF) message.

12. The system of claim 9, wherein the UPID is associated with a process identifier of a process executing in the OS.

13. The system of claim 9, wherein determine to send the message from the kernel space to the user space, the processing device is to determine to send the message from the kernel space to the user space based on the UPID corresponding to a non-rate limited process.

14. The system of claim 9, wherein to determine to send the message from the kernel space to the user space, the processing device is to determine to send the message from the kernel space to the user space based on the message type corresponding to a non-rate limited message type.

15. The system of claim 9, wherein to transmit the message from the kernel space to the user space, the processing device is to transmit the message to a ring buffer.

16. The system of claim 9, wherein the message type includes at least one of:
  file created,
  process created, or
  network socket opened.

17. A non-transitory computer readable medium, having instructions stored thereon which, when executed by a processing device, cause the processing device to:
  obtain, in a kernel space of an operating system (OS), a message comprising a unique process identifier (UPID) and a message type;
  determine that an entry exists in a data structure in the kernel space based on the UPID and the message type corresponding to a key in the data structure in the kernel space;
  determine, by the processing device, to drop the message in the kernel space based on at least one of:
    the UPID,
    the message type, or
    a token count and a discrete time unit in the entry in the data structure in the kernel space,
  wherein the determination to drop the message in the kernel space comprises:
    compute a difference between a current discrete time unit and the discrete time unit in the entry;
    compute a new token count as a sum of the token count and the difference;
    set a range of a token bucket associated with the new token count as zero to a maximum token count minus the token count, inclusive;
    perform an atomic add operation to set the token count to be equal to the token count plus the new token count minus one; and
    determine to drop the message in the kernel space based on the token count being zero; and
  drop the message in the kernel space based on the determination to drop the message in the kernel space.

18. The non-transitory computer readable medium of claim 17, wherein the message comprises an extended Berkeley packet filter (eBPF) message.

19. The non-transitory computer readable medium of claim 17, wherein the UPID is associated with a process identifier of a process executing in the OS.

20. The non-transitory computer readable medium of claim 17, wherein the message type includes at least one of:
  file created,
  process created, or
  network socket opened.

* * * * *